Nov. 5, 1968  C. J. STALEGO  3,409,072
METHOD AND APPARATUS FOR PROCESSING HEAT-SOFTENED MATERIAL
Filed July 21, 1966  2 Sheets-Sheet 1

INVENTOR.
CHARLES J. STALEGO
BY
Staelin + Overman
ATTORNEYS 3,409,072
METHOD AND APPARATUS FOR PROCESSING HEAT-SOFTENED MATERIAL
Charles J. Stalego, Newark, Ohio, assignor to Owens-Corning Fiberglas Corporation, a corporation of Delaware
Filed July 21, 1966, Ser. No. 566,956
18 Claims. (Cl. 165—2)

ABSTRACT OF THE DISCLOSURE

A system for selectively controlling the heat pattern at the feeder tips of an electrically heated bushing having side walls and electrical terminals attached to the side walls for the connection of an electric current to the bushing. A fluid is passed in direct heat exchange relationship with an area of at least one of the side walls and terminals adjacent the attachment of the terminal to the side wall. Sensors on the feeder tip wall may be utilized to control the amount of heat exchange effected.

---

This invention relates generally to method and apparatus for processing heat-softened material, such as glass, and particularly to a method and apparatus for controlling bushing temperatures and the heat patterns of feeder tips on a bushing.

In the production of continuous glass fibers, a glass feeder or bushing is utilized for forming a plurality of molten glass streams which are attenuated or drawn out from feeder tips on the bushing to form fibers. The bushing generally has an elongated rectangular configuration and is provided at its ends with electrical terminals. Heavy electrical bus bars are connected or clamped to the terminal and electrical current is thereby passed through the bushing to heat the bushing to maintain desired glass melting temperatures by resistance heating.

In order to withstand the temperatures encountered in melting glass, platinum or an alloy thereof with iridium is generally employed to form the bushing. Platinum is a ductile metal and accordingly is subject to bending and deformation, particularly at elevated temperatures as in the glass melting range of 2000-2500° F. Thus, any stress placed on the terminal or on the bushing will generally result in deformation of the terminal or bushing or both.

In the past, a substantial number of problems have been encountered with respect to the bending of terminals and early failure of bushings. For example, during operation of a bushing, the heat pattern through the bushing will change, requiring adjustment of the bus bar terminal clamp on the bushing terminal. Bus bars of heavy copper have been employed in order to conduct the necessary amounts of current into the bushing. When it was necessary to adjust the terminal clamp on the terminal to correct or adjust the heat pattern, a clamping bolt was loosened and the terminal clamp forced to a different position by forcing the bus bar. This has been at best a hit or miss procedure and accurate positioning of the clamp on the terminal without setting up a stress on the terminal has been substantially impossible. Also, the forced deflection of the terminal clamp often causes misalignment of the clamp and the terminal. Subsequently, when the clamp was tightened, the terminal, being ductile, was deformed into alignment with the clamp and in extreme instances was actually fractured. Since a bushing is a welded structure, the stresses applied to the terminals pull and distort the welds usually resulting in premature failure of the bushing.

As noted, adjustment of the heat pattern at the feeder tips of a bushing is accomplished by loosening the terminal clamp, moving the clamp to increase or decrease resistance as may be required, and tightening the clamps. This is a tedious and difficult process with no assurance of precision. It is necessary to turn the power off when adjusting the terminal clamps. Therefore the operation is upset, sometimes for several hours. Since the terminal clamp adjustment is done visually there is no assurance that the amount of movement is correct and more bushing and current shutdowns may be required. In making terminal clamp adjustments the operator must climb up to the very hot zone and make adjustments with clumsy protective mittens. There is also a danger of the operator causing breakouts in the primary fibers in the adjacent bushings.

The heat pattern of the feeder tips varies during operation, with the feeder tip areas adjacent the terminals usually becoming hotter than the more centrally located feeder tip areas. The temperature of the glass thus varies causing a variance in the diameter of the fibers being drawn, and in extreme cases, breakouts in one of the areas. Therefore, in the past the position of the terminal clamps have been adjusted to adjust the heat pattern of the feeder tips.

It has been discovered that the heat pattern of the feeder tips of an electrically heated bushing having electrical terminals extending from the walls thereof for the connection of electrical current thereto may be controlled by passing a fluid in heat exchange relationship with an area of either the wall or the terminal adjacent the attachment of the terminal to a wall of the bushing.

Accordingly, it is an object of this invention to provide an improved system for controlling the heat pattern at the feeder tips of a bushing.

It is another object of this invention to provide an improved system for controlling the heat pattern of a bushing which is more effective than the prior method of terminal clamp adjustment, provides an unlimited number of heat pattern control adjustments, which is accomplished without shutting bushing power off, which may be remotely controlled, and which provides a much more exacting and precise control of the heat pattern of the feeder tips.

The system of this invention features means for passing a fluid in heat exchange relationship with an area of one of the walls or terminals adjacent the attachment of a terminal to a wall of a bushing. The fluid may be a liquid or a gas. The fluid may be passed in heat exchange relationship with a wall of the bushing adjacent the attachment of a terminal to the wall. Alternatively, the fluid may be passed in heat exchange relationship with the terminal adjacent the wall of the bushing. The terminal or wall preferably has aperture means formed therein for the passage therethrough of the fluid to obtain an improved heat exchange relationship. A manifold is advantageously utilized to guide the fluid through the aperture means to gain a more exact control of the heat exchange relationship. The fluid passing means may include a fluid pump, fluid flow control means for each of the terminals or walls, means for filtering and purifying the fluid to remove substances harmful to the wall and terminal material, and means for controlling the temperature of the fluid before it reaches the bushing.

The bushing being controlled may have a plurality of terminals, means for sensing the temperature of a feeder tip area which is centrally located on the bushing with respect to a plurality of terminals, means for supplying current to the terminals, and means responsive to the temperature sensing means for controlling the amount of current supplied to the terminals. For a more precise control the system may include second means for sensing the temperature of feeder tip areas adjacent each terminal, means for passing a fluid in heat exchange relationship with each of the terminals, and means responsive to the second means for controlling the amount of heat exchange obtained between the fluid and each of the terminals. The heat exchange controlling means may comprise means for controlling the volume of fluid passed in heat exchange relationship with a terminal or may comprise means for controlling the temperature of the fluid passed in heat exchange relationship with the terminal, or a combination of both. In the most exact method of control the system may include means for comparing the temperature of the centrally located feeder tip area with the temperatures of he terminal adjacent feeder tip areas for deriving a single or a plurality of differential signals. The means for controlling the amount of heat exchange obtained between the fluid and each of the terminals may be made responsive to the single or the plurality of differential signals. If the means for controlling the amount of heat exchange is responsive to the plurality of signals it may be made operative to provide a separate heat exchange control for each of the corresponding plurality of terminals or walls.

This invention further features a method for controlling the heat pattern at the feeder tips of an electrically heated bushing, the steps of which method are set forth hereinafter in operating the system disclosed herein, which system is particularly advantageous to carry out the method disclosed.

Other objects, features and advantages of this invention will become apparent when the following description is taken in conjunction with the accompanying drawings, in which.

Figure 1:
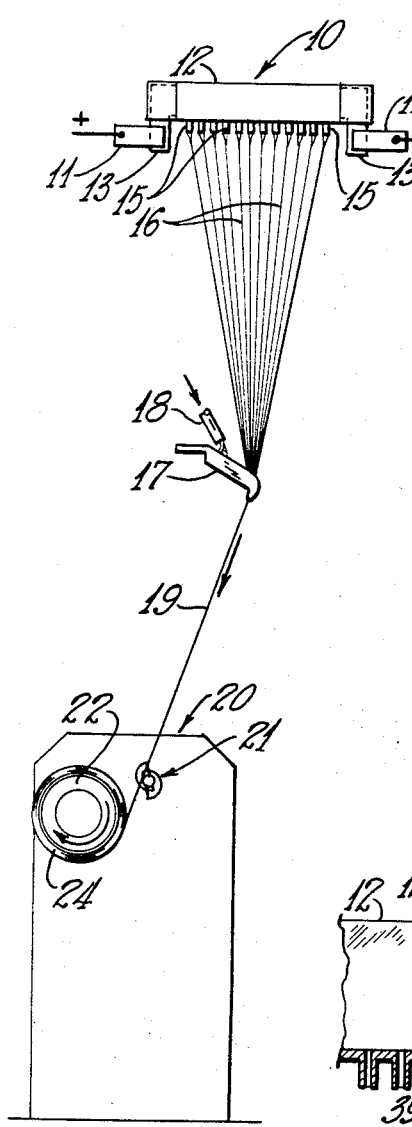
FIGURE 1 is a general layout of fiber forming apparatus adapted for incorporation of the principles of the present invention.

Referring to the drawings in greater detail there is illustrated in FIGURE 1 an assembly in which the present invention may be incorporated. A melting or bushing unit generally indicated at 10 is arranged to receive heat-softened material from a forehearth or furnace, not shown, or to melt batch material received. A pool of molten material is contained by a feeder 12 and maintained at a predetermined temperature. Electrical current is fed to terminals 13 of the feeder or bushing 12 by the connection thereto of terminal clamps 11 to which a suitable supply of electrical current is connected. The molten material flows as streams from orificed feeder tips 15 at the bottom of the feeder or bushing and are attenuated into continuous fibers 16 which are gathered into a strand 19 by passage over a gathering member 17 to which sizing fluid is fed from a tube 18 connected to a supply source (not shown) to lubricate the fibers prior to incorporation into the strand 19. The strand 19 is collected by a winder 20 having a rotary collet 22 on which the strand is wound into a package 24 as it is traversed by a suitable traversing device 21 for distribution on the package.

In the past there has been difficulty in controlling the heat pattern at the feeder tips of the bushing since extra heat is generated at the ends of the bushing in the area adjacent where the terminals are attached to the end walls of the bushings. This is the result of current flow being concentrated in the smaller cross section at the end wall and where the terminal attaches to the end wall. Accordingly, the ends of the bushing tend to be hotter than the middle of the bushing thus producing a higher temperature in the feeder tip areas adjacent the ends and terminals of the bushing thereby disrupting the uniformity of the fibers drawn from the feeder tips across the bushing because of the nonuniformity of temperature across the entire feeder tip area.

In the past an attempt has been made to control this situation by water cooling the terminal clamps to absorb heat generated in or transferred to the terminals 13 from the feeder or bushing. However, even though the water cooling of the terminal clamps did aid in improving the situation the precise control required was not attainable by such procedures. Even when the terminal clamps 11 were water cooled it was still necessary to readjust the position of the water cooled terminal clamps to effect a change in the heat pattern at the feeder tips. For example, when the center of the feeder is relatively cold compared to the ends, the clamps were moved outwardly to equalize the temperature across the feeder zone. Correspondingly, when the temperature clamps were moved inwardly on the terminals the proximity of the cool clamps to the feeder ends effected a greater absorption of heat from the ends to make the center of the feeder more nearly the same temperature as the ends. In the adjustment of the terminal clamps the attendant disadvantages as described hereinbefore interrupted the production and still did not provide the uniform temperatures desired.

Figure 2:
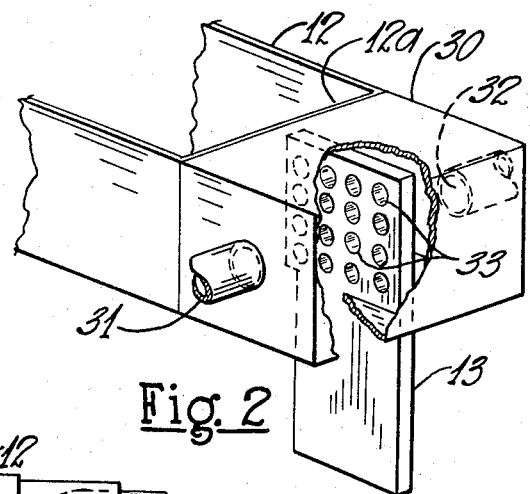
FIGURE 2 is a view in perspective of a bushing end and terminal illustrating means for controlling the heat pattern at the feeder tips.

It has been discovered that fluid cooling may be utilized to change the temperature of the terminal or the wall adjacent the terminal to change the heat pattern of the feeder tips. Referring to FIGURE 2 there is illustrated an enlarged perspective view of the feeder or bushing 12 having the terminal 13 attached to one end thereof. In this embodiment, fluid is passed in heat exchange relationship primarily with the terminal 13 and incidentally with the wall end 12a of the feeder to which the terminal is attached. A manifold 30 is secured to the end wall 12a of the feeder 12 and has an inlet means 31 and an outlet means 32 for the passage of fluid therethrough. Apertures 33 have been formed through terminal 13 in the end of the terminal adjacent the bushing 12 so that the fluid may be passed through the terminal and gain an improved heat exchange relationship therewith. By passing the fluid through the manifold 30 and the aperture means 33 in the terminal 13 the temperature of the terminal 13 and the wall 12a are controlled to thus also control the heat pattern of the feeder tips adjacent the end of the feeder or bushing 12.

Figure 4:
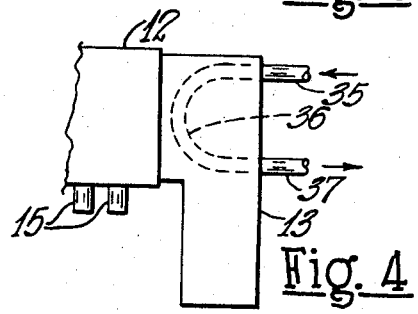
FIGURE 4 illustrates a second embodiment of the teachings of this invention.
Figure 5:
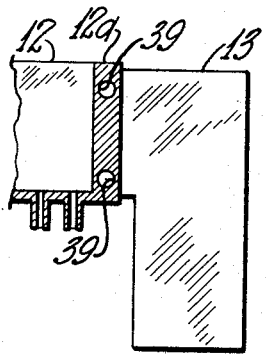
FIGURES 5 and 6 illustrate a third embodiment of the teachings of this invention in a cross-sectional side view and a top plan view, respectively, of a bushing end and terminal arrangement.
Figure 6:
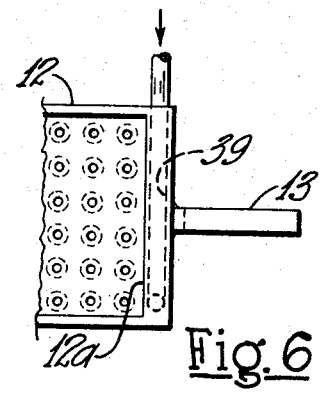

Referring to FIGURE 4 there is illustrated an alternative embodiment in which a fluid is passed in through inlet tube 35, through one or more loops of coils or aperture means 36 embedded in or formed in terminal 13, and returned to a fluid pumping system through outlet tube 37. Referring to FIGURES 5 and 6 there is illustrated a still further embodiment in which a fluid is passed through one or more loops of a coil 39 or aperture means embedded in or formed in the wall end 12a of the bushing 12.

Figure 3:
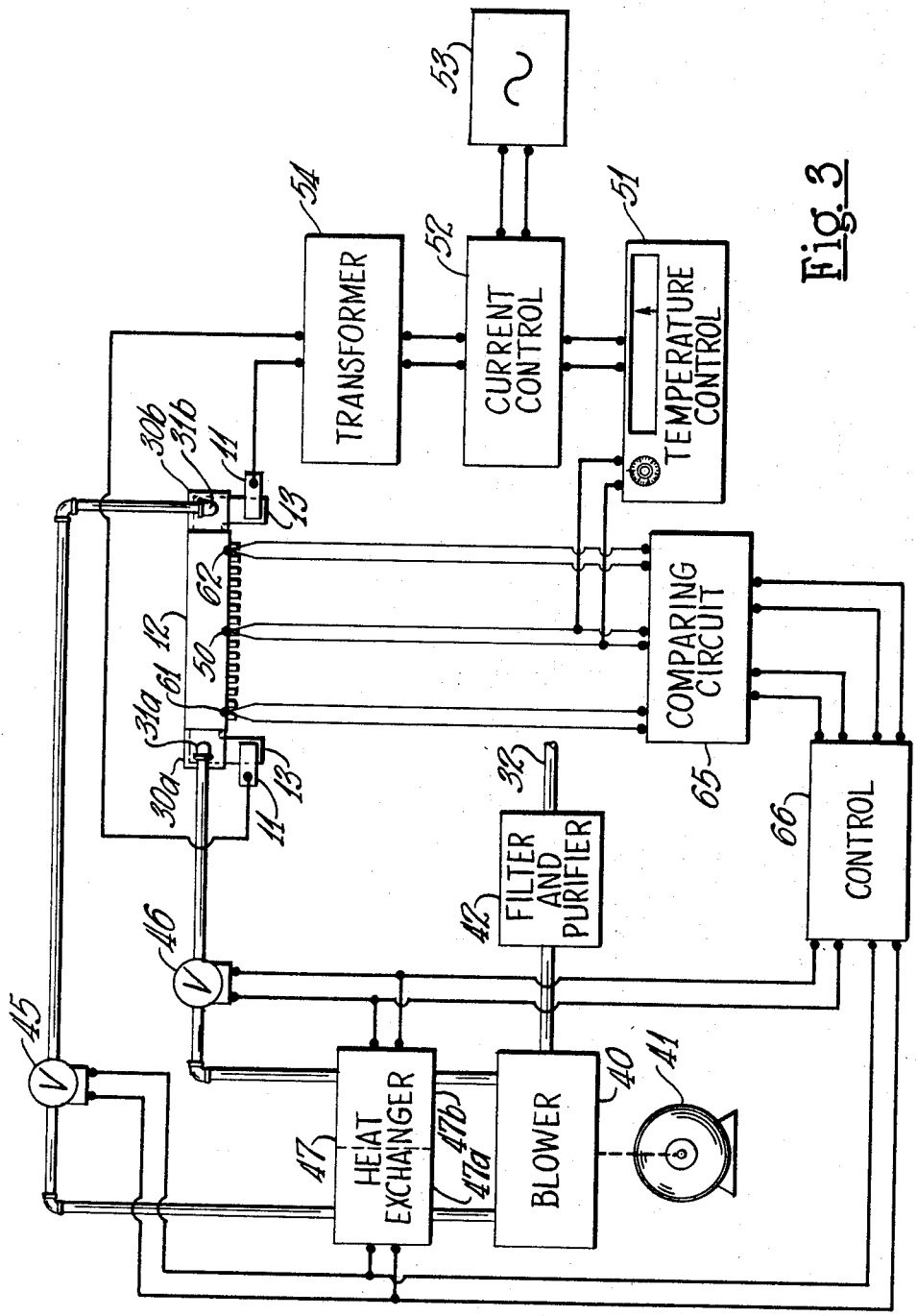
FIGURE 3 is a schematic diagram of a control system incorporating the features of the present invention.

Referring to FIGURE 3 there is illustrated a system for controlling the heat pattern of the feeder tips 15 of a feeder or bushing 12 which is applicable to any of the embodiments shown in FIGURES 2, 4, 5 and 6, or modifications thereof, but which will be described with particular reference to the embodiment illustrated in FIGURE 2.

The temperature of a bushing or feeder 12 has been controlled in the past by sensing the temperature of a feeder tip area centrally located with respect to the terminals 13 by a sensor such as thermocouple 50 which provides a signal to a temperature controller 51. The temperature controller 51 compares the signal received from thermocouple 50 with a preset or set point temperature desired and provides a signal to a current control unit such as a saturable core reactor or silicone controlled rectifier which, in turn, controls current fed from a source 53 to a transformer 54. The transformer 54 provides the current to the terminal clamps 11 which, in turn, feeds the current through the terminals 13 and the feeder 12 to heat the bushing and the molten material therein.

In carrying out the teachings of this invention the feeder 12 may be provided with manifolds 30a and 30b for cooling the terminals 13 and the end walls of the feeder or bushing 12. Means for passing fluid through the manifolds 30a and 30b include inlet pipes 31a and 31b connected to a fluid pump 40 which may be driven by a motor 41. The fluid pump 40 may be a blower if a gaseous fluid is used. A filter and/or purifier unit 42 may be connected in a return fluid line 32 to eliminate impurities from the fluid to prevent contamination of or other deleterious effects on the material of the terminals and bushing. The filter may include means for removing erosive particles to prevent any eroding of the material and may also include means such as activated charcoal and ceramic filters for removing water and oil from the fluid being circulated. The motor 41 may be set to drive the blower 40 to deliver a predetermined amount of fluid to effect a desired heat exchange to maintain the uniformity of the heat pattern desired for the feeder tips. The amount of fluid delivered and thus the heat exchanged may be controlled manually by settings of fluid flow control valves 45 and 46. The amount of heat removed or added may be also controlled by manual settings of separate sections 47a and 47b of an outside heat exchanger generally indicated at 47 which may control the temperature of the fluid being passed through the manifolds 30a and 30b.

Although the above settings may be made manually it is desirable to maintain a continuing and automatic precise control of the heat pattern desired. This is accomplished by providing temperature sensing means 61 and 62 in feeder tip areas adjacent the terminals 13. The temperature sensors may be thermocouples 61 and 62 and provide signals to a comparing unit 65. The comparing unit 65 may compare the collective signals derived from the thermocouples 61 and 62 and provide a single differential output which controls either the fluid flow control valve means 45 and 46 or the heat exchanger 47 to effect the amount of heat exchange desired. Alternatively, and for a more precise control, each signal derived from the thermocouples or sensors 61 and 62 is compared individually with the temperature signal supplied by the thermocouple or sensor 50 and a plurality of differential signals are provided which are forwarded through an amplifier or control unit 66 to individually control valves 45 and 46 or heat exchange sections 47a and 47b to effect individual control of the amount of heat exchanges in manifolds 30a and 30b, and thus effect individual control of the feeder tip areas adjacent each of the plurality of terminals 13.

By utilizing the system and the invention described hereinbefore, terminal clamp adjustments have been eliminated for heat pattern control, thus avoiding the continual or even occasional terminal clamp adjustments which cause oxidation of clamp jaws and contamination of the bushing terminal with copper oxide which results in a high resistance connection requiring the use of more power and results in loss of heat pattern control. More latitude in terminal clamp design is made possible, since movement after an initial permanent and effective clamping is accomplished is eliminated. Bushing heat pattern adjustment by fluid cooling is much more effective than terminal clamp adjustment, whether or not the terminal clamps are water cooled. Heat pattern control by fluid cooling affects primarily only the end being adjusted. The center is affected only a very minor amount. The number of heat pattern control adjustments by fluid cooling is unlimited, except by the normal life of the bushing. The number of adjustments by terminal clamps is limited by destruction of the electrical contact of the bushing ear and may necessitate removal of the terminal clamp and/or the bushing. Control of heat pattern by fluid cooling is accomplished without shutting the bushing power off, as opposed to terminal clamp adjustment. Therefore, with the fluid cooled method shown herein the operation is not upset as it is sometimes for several hours with the terminal clamp adjustment. Terminal clamp adjustment is a trial and error method while with the fluid cooling adjustment heat pattern control can be accomplished precisely without requiring a bushing shutdown. With the method herein the heat pattern can be remotely controlled by either means of fluid flow control or temperature control of the fluid being utilized. The improvements result in increased bushing life.

In experiments conducted with the control system as described herein air was used as the fluid and approximately zero to 25 cubic feet per hour was utilized to make the various adjustments as desired. In utilizing the system it is desirable to carry away the excess heat to maintain the molten glass at the desired temperature for fiber forming. The system enables avoiding carrying away more heat than necessary and thus avoids freezing the glass and causing breakouts in the fibers. Although air was used in the first experiment it is contemplated that any liquid, fluid or other coolant may be utilized that will not degrade the properties of the terminal or bushing. The disposition of the aperture means formed in the terminal 13 are not vital but must be controlled so that too much material will not be removed so that the resistance of the terminal will become too high. Further, the holes should be distributed so that sufficient surface engagement is acquired with the coolant to attain the heat exchange desired. Further, sufficient apertures or holes are desirable to allow the flow of air necessary to cool without placing a pressure on the system which would rupture the manifold or related fluid delivery systems.

There has thus been disclosed a method for controlling the heat pattern of feeder tips of an electrically heated bushing which comprises the step of passing a fluid in heat exchange relationship with an area of a terminal adjacent a bushing wall or of an adjacent wall where said terminal is attached to said wall, or both. A further step is preferably included of controlling the amount of heat exchange between said fluid and said area in response to a temperature sensed in a feeder tip area adjacent to said terminal. Further, the temperature of a feeder tip area which is centrally located on said bushing may be compared with the tip area adjacent the terminal to institute a predetermined heat exchange in response to a difference in temperatures.

Although the invention has been described with reference to a bushing or feeder being utilized for the forming of continuous fibers, it should be noted that the invention is equally applicable to bushings or feeders utilized in the attenuation of fibers by hot gaseous blasts or other means of attenuation.

It is apparent that within the scope of the invention, modifications and different arrangements may be made other than as herein disclosed, and the present disclosure is illustrative merely, the invention comprehending all variations thereof.

I claim:

1. A system for selectively controlling the heat pattern at the feeder tips of an electrically heated bushing having side walls, comprising electrical terminals attached to the side walls for the connection of an electric current thereto and means for passing a fluid in direct heat exchange relationship with an area of one of said side walls and terminals adjacent the attachment of a terminal to a side wall.

2. A system as defined in claim 1 in which said fluid is passed in heat exchange relationship with a wall of said bushing adjacent the attachment of a terminal to said wall.

3. A system as defined in claim 1 in which said fluid is passed in heat exchange relationship with a terminal.

4. A system for controlling the heat pattern at the feeder tips of an electrically heated bushing having electrical terminals extending from the walls thereof for the connection of an electric current thereto comprising means for passing a fluid in heat exchange relationship with an area of one of said walls and terminals adjacent the attachment of a terminal to a wall, one of said wall and terminal having aperture means formed therein for the passage therethrough of said fluid to obtain an improved heat exchange relationship.

5. A system as defined in claim 4 which further includes a manifold to guide said fluid through said aperture means to gain a more exact control of said heat exchange relationship.

6. A system as defined in claim 1 in which said fluid passing means includes a fluid pump.

7. A system as defined in claim 1 in which said fluid passing means includes fluid flow control means for each of said terminals.

8. A system as defined in claim 1 in which said fluid passing means includes means for controlling the temperature of said fluid.

9. A system as defined in claim 1 in which said bushing has a plurality of terminals, means for sensing the temperature of a feeder tip area which is centrally located on said bushing with respect to said plurality of terminals, means for supplying current to said terminals, and means responsive to said temperature sensing means for controlling the amount of current supplied to said terminals.

10. A system as defined in claim 1 which further includes second means for sensing the temperature of feeder tip areas adjacent each terminal, means for passing a fluid in heat exchange relationship with each of said terminals, and means responsive to said second means for controlling the amount of heat exchange attained between said fluid and each of said terminals.

11. A system as defined in claim 9 which further includes second means for sensing the temperature of feeder tip areas adjacent each terminal, means for passing a fluid in heat exchange relationship with each of said terminals, and means responsive to said second means for controlling the amount of heat exchange attained between said fluid and each of said terminals.

12. A system as defined in claim 11 in which said heat exchange controlling means comprises means for controlling the volume of fluid passed in heat exchange relationship with a terminal.

13. A system as defined in claim 11 in which said heat exchange controlling means comprises means for controlling the temperature of said fluid passed in heat exchange relationship with a terminal.

14. A system for controlling the heat pattern at the feeder tips of an electrically heated bushing having electrical terminals extending from the walls thereof for the connection of an electric current thereto comprising means for passing a fluid in heat exchange relationship with an area of one of said walls and terminals adjacent the attachment of a terminal to a wall, second means for sensing the temperature of feeder tip areas adjacent each terminal, means for passing a fluid in heat exchange relationship with each of said terminals, means responsive to said second means for controlling the amount of heat exchange attained between said fluid and each of said terminals, and means for comparing the temperature of said centrally located feeder tip area with the temperatures of said terminal adjacent feeder tip areas for deriving a differential signal, said means for controlling the amount of heat exchange attained between said fluid and each of said terminals being responsive to said differential signal.

15. A system for controlling the heat pattern at the feeder tips of an electrically heated bushing having electrical terminals extending from the walls thereof for the connection of an electric current thereto comprising means for passing a fluid in heat exchange relationship with an area of one of said walls and terminals adjacent the attachment of a terminal to a wall, second means for sensing the temperature of feeder tip areas adjacent each terminal, means for passing a fluid in heat exchange relationship with each of said terminals, means responsive to said second means for controlling the amount of heat exchange attained between said fluid and each of said terminals, and means for deriving a plurality of differential signals from a comparison of temperatures of said centrally located feeder tip area and each of said terminal adjacent feeder tip areas, said means for controlling the amount of heat exchange being responsive to said plurality of signals to provide a separate heat exchange control for each of said corresponding plurality of terminals.

16. A method for selectively controlling the heat pattern of feeder tips of an electrically heated bushing which has electrical terminals attached to side walls thereof which comprises the step of passing a fluid in direct heat exchange relationship with an area of one of said terminals and side walls adjacent where said terminal is attached to said side wall to control the heat resulting from current flow in that area.

17. A method as defined in claim 16 which further includes the step of controlling the amount of heat exchange between said fluid and said area in response to a temperature sensed in a feeder tip area adjacent to said terminal.

18. A method as defined in claim 16 which further includes the step of controlling the amount of heat exchange between said fluid and said area by comparing the temperature of a feeder tip area adjacent said terminal and the temperature of a feeder tip area centrally located on said bushing to institute a predetermined heat exchange in response to a difference in temperatures.

References Cited

UNITED STATES PATENTS

| 2,721,729 | 10/1955 | Van Riper | 165—64 |
| 2,912,556 | 11/1959 | Hold | 165—26 |
| 3,164,458 | 1/1965 | Mitchell | 65—356 |
| 3,198,615 | 8/1965 | Stalego | 65—12 |
| 3,200,878 | 8/1965 | Ainley et al. | 165—64 |
| 3,305,332 | 2/1967 | Roberson et al. | 65—355 |
| 3,334,981 | 8/1967 | Glaser | 65—12 |

ROBERT A. O'LEARY, *Primary Examiner.*

CHARLES SUKALO, *Assistant Examiner.*